United States Patent
Burrell et al.

(10) Patent No.: US 8,694,605 B1
(45) Date of Patent: *Apr. 8, 2014

(54) SYSTEMS AND METHODS FOR DISSEMINATING CONTENT TO REMOTE DEVICES

(75) Inventors: Jamie Lee Burrell, Twickenham (GB); Kiat Huang, Aldershot (GB)

(73) Assignee: Google Inc., Mountain View, CA (US)

( * ) Notice: Subject to any disclaimer, the term of this patent is extended or adjusted under 35 U.S.C. 154(b) by 70 days.

This patent is subject to a terminal disclaimer.

(21) Appl. No.: 13/597,912

(22) Filed: Aug. 29, 2012

Related U.S. Application Data

(63) Continuation of application No. 13/485,020, filed on May 31, 2012, now Pat. No. 8,291,041.

(51) Int. Cl.
*G06F 15/16* (2006.01)
*G06F 17/00* (2006.01)

(52) U.S. Cl.
USPC ............................ 709/217; 709/232; 715/208

(58) Field of Classification Search
None
See application file for complete search history.

(56) References Cited

U.S. PATENT DOCUMENTS

| | | | |
|---|---|---|---|
| 5,930,474 A * | 7/1999 | Dunworth et al. | 709/217 |
| 6,542,933 B1 * | 4/2003 | Durst et al. | 709/229 |
| 6,594,694 B1 * | 7/2003 | Najork et al. | 709/219 |
| 6,694,333 B2 * | 2/2004 | Oldham | 1/1 |
| 7,383,328 B2 * | 6/2008 | Iyoki | 709/222 |
| 7,640,491 B2 | 12/2009 | Goodacre et al. | |
| 7,895,296 B1 * | 2/2011 | Dayan | 709/219 |
| 8,108,792 B2 | 1/2012 | Lin-Hendel | |
| 2002/0010746 A1 * | 1/2002 | Jilk et al. | 709/206 |
| 2003/0065739 A1 * | 4/2003 | Shnier | 709/217 |
| 2004/0054750 A1 * | 3/2004 | de Jong et al. | 709/217 |
| 2004/0054754 A1 * | 3/2004 | Hwang et al. | 709/217 |
| 2005/0108418 A1 | 5/2005 | Bedi | |

* cited by examiner

*Primary Examiner* — Ranodhi Serrao
(74) *Attorney, Agent, or Firm* — Troutman Sanders LLP; James E. Schutz; Mark Lehi Jones

(57) ABSTRACT

Certain embodiments of the invention may include systems and methods for disseminating content to remote devices. According to an exemplary embodiment of the invention, a method is provided that can include receiving, at a computer system, registration information for one or more remote devices; registering the one or more remote devices; selecting content to associate with a selected subset of the one or more registered remote devices for presentation; generating a message comprising a primary uniform resource identifier (URI) corresponding to a source for the content; selecting at least one of the one or more registered remote devices for presenting the content; and sending the generated message to the at least one selected registered remote device, wherein the at least one selected registered remote device is configured to automatically retrieve and present the retrieved content from the source identified by the primary URI in the message.

14 Claims, 5 Drawing Sheets

SYSTEMS AND METHODS FOR DISSEMINATING CONTENT TO REMOTE DEVICES

RELATED APPLICATIONS

This application is related to application Ser. No. 13/485,020, filed on May 31, 2012, entitled: "Systems and Methods for Disseminating Content to Remote Devices," the contents of which are hereby incorporated by reference in their entirety.

FIELD OF THE INVENTION

This invention generally relates to disseminating content to remote devices.

BACKGROUND OF THE INVENTION

Displays or signs are utilized in numerous settings around the world for communicating information. Businesses advertise goods or services on non-electronic media such as billboards, but many signage applications require displays that can be updated multiple times over a given period. For example, airline transportation operations may utilize many electronic displays to disseminate real-time scheduling and gate information to travelers.

Some of the challenges associated with electronic signage devices include delivering content, organizing the content, scheduling display of the content, and managing the devices without costly setup or constant on-site physical interaction.

BRIEF SUMMARY OF THE INVENTION

Some or all of the above needs may be addressed by certain embodiments of the invention. Certain embodiments of the invention may include systems and methods for disseminating content to remote devices.

According to an exemplary embodiment of the invention, a computer-implement method is provided that includes receiving, at a computer system, registration information for one or more remote devices. In an exemplary embodiment, the one or more remote devices are configured at least to present one or more of visual or audible information. Exemplary embodiments of the method can include registering, at the computer system, the one or more remote devices based at least in part on the received registration information. In an exemplary embodiment, the method includes selecting content to associate with a selected subset of the one or more registered remote devices for presentation. The method includes generating a message comprising a primary uniform resource identifier (URI) corresponding to a source for the content. The method includes selecting at least one of the one or more registered remote devices for presenting the content, and sending the generated message to the at least one selected registered remote device. In an exemplary embodiment, the at least one selected registered remote device is configured to automatically retrieve the content from the source identified by the primary URI in the message. In an exemplary embodiment, the at least one selected registered remote device is further configured to automatically present the retrieved content.

According to another exemplary embodiment, a system is provided that includes at least one memory for storing data and computer-executable instructions; and at least one processor configured to access the at least one memory. The processor is further configured to execute the computer-executable instructions to receive registration information associated with one or more remote devices. In an exemplary embodiment, the processor is further configured to register the one or more remote devices based at least in part on the received registration information. In an exemplary embodiment, the processor is further configured to select content to associate with a selected subset of the one or more registered remote devices for presentation by the selected subset of the one or more registered remote devices. In an exemplary embodiment, the processor is further configured to generate a message comprising a primary uniform resource identifier (URI) corresponding to a source for the content. In an exemplary embodiment, the processor is further configured to select at least one of the one or more registered remote devices for presenting the content. In accordance with an exemplary embodiment, the processor is configured to send the generated message to the at least one selected registered remote device. In an exemplary embodiment, the at least one selected registered remote device is configured to automatically retrieve the content from the source identified by the primary URI in the message, and the selected registered remote device is further configured to automatically present the retrieved content.

According to another exemplary embodiment, non-transitory computer-readable medium is provided that stores instructions executable by one or more processors to perform a method. The method includes receiving, at a computer system, registration information for one or more remote devices. In an exemplary embodiment, the one or more remote devices are configured at least to present one or more of visual or audible information. Exemplary embodiments of the method can include registering, at the computer system, the one or more remote devices based at least in part on the received registration information. In an exemplary embodiment, the method includes selecting content to associate with a selected subset of the one or more registered remote devices for presentation. The method includes generating a message comprising a primary uniform resource identifier (URI) corresponding to a source for the content. The method includes selecting at least one of the one or more registered remote devices for presenting the content, and sending the generated message to the at least one selected registered remote device. In an exemplary embodiment, the at least one selected registered remote device is configured to automatically retrieve the content from the source identified by the primary URI in the message. In an exemplary embodiment, the at least one selected registered remote device is further configured to automatically present the retrieved content.

According to an exemplary embodiment of the invention, a computer-implemented method is provided that includes transmitting registration information to a registration database. In an exemplary embodiment, the method can include receiving, based at least in part on the registration information, a message comprising a uniform resource identifier (URI) corresponding to a source for display content. In an exemplary embodiment, the method can include retrieving the content from the source identified by the URI. In an exemplary embodiment, the method can include associating an application with the retrieved content, launching the associated application, and presenting the content. According to exemplary embodiments, presenting the content includes generating one or more of images, rich web content, custom visualization, animation, sound, an update, a setup, scheduled content, or a configuration.

Other embodiments, features, and aspects of the invention are described in detail herein and are considered a part of the claimed inventions. Other embodiments, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein.

DETAILED DESCRIPTION OF THE INVENTION

Figure 1:
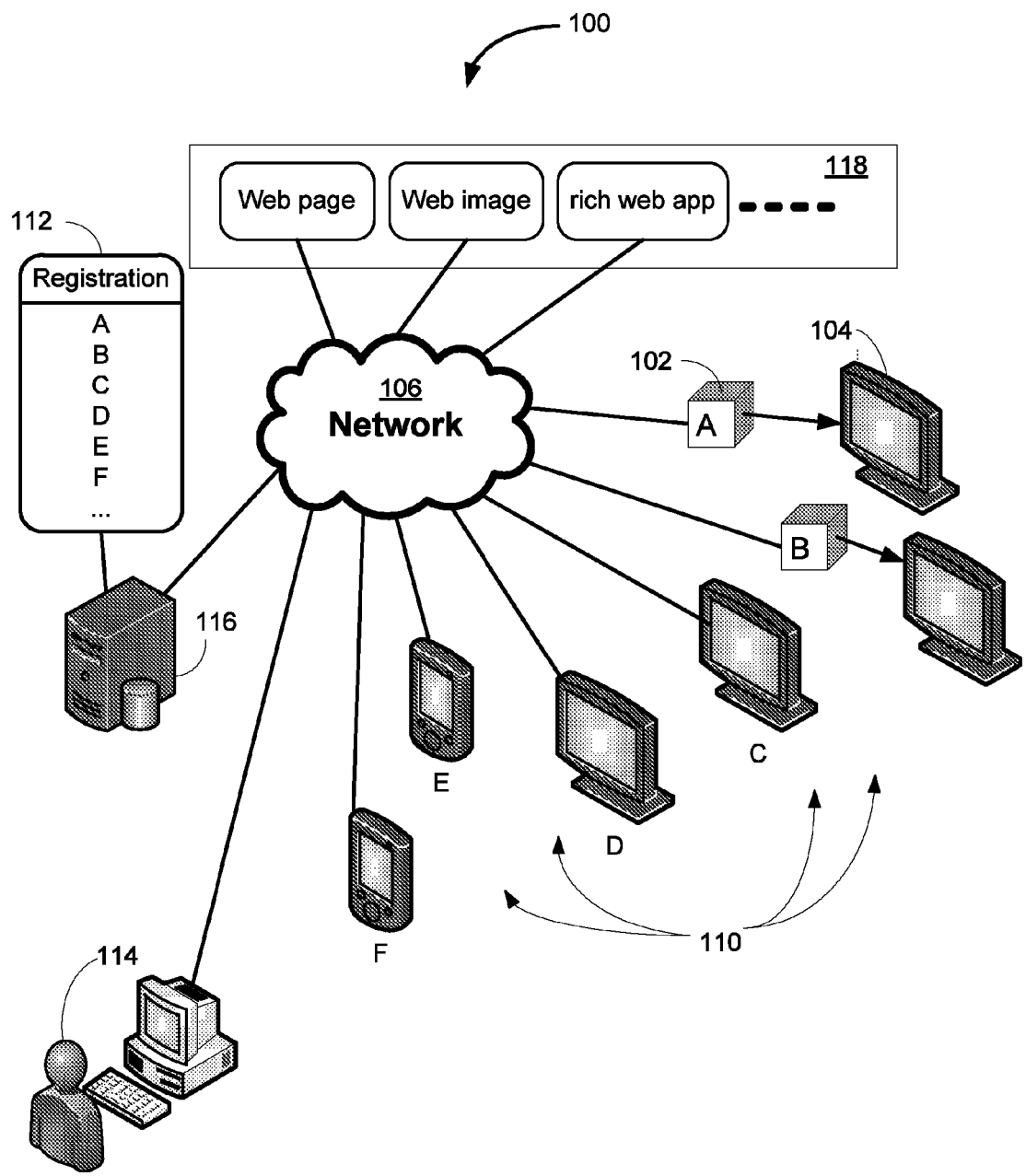
FIG. 1 is a block diagram of an illustrative content dissemination system 100, according to an exemplary embodiment of the invention.

Embodiments of the invention will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the following description, numerous specific details are set forth. However, it is to be understood that embodiments of the invention may be practiced without these specific details. In other instances, well-known methods, structures and techniques have not been shown in detail in order not to obscure an understanding of this description. The term "exemplary" herein is used synonymous with the term "example" and is not meant to indicate excellent or best. References to "one embodiment," "an embodiment," "exemplary embodiment," "various embodiments," etc., indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Certain embodiments of the invention may enable cost-effective and efficient deployment and configuration of communications devices and associated displays. Exemplary embodiments may enable efficiently controlling content for display or presentation on such devices. In certain exemplary embodiments, the content may include sound, video, rich web applications, web pages, images, machine control, updates, etc. The use of the terms presentation or presenting herein is defined to mean any appropriate expression of the content on the targeted device. For example, presentation may mean producing a visual image representation of selected content on a targeted screen or display. In another example, presentation may mean reproducing sounds, and so forth. According to exemplary embodiments, sound may include music, speech, sequences of sound, midi triggers, etc. According to certain exemplary embodiments, a cloud-based internet system may be utilized for securely sending uniform resource identifiers (URIs) of desired content to selected display devices, such as TVs, tablets, video walls, etc. In accordance with exemplary embodiments, the selected display devices may be generally located in commercial or institutional environments.

According to certain exemplary embodiments, a custom service or application may be installed on the display device to register the device with a server. Once registered, and according to an exemplary embodiment, the custom service or application may enable the registered device to listen for updates from a central server. According to one exemplary embodiment, updates or short-notifications may be sent by a user or sent automatically from the server to the device as a message. For example a cloud-to-device-messaging (e.g., C2DM) framework associated with Android devices may be utilized for sending C2DM messages that contain a URI. According to an exemplary embodiment, when the device receives the URI, it may create a software object known as an Intent. Those skilled in the art are familiar with an Intent which may include, but is not limited to action, data, and/or other associated attributes. In one exemplary embodiment, based on the received URI, the Intent information can be handled by the device's operating system in an appropriate manner. For example, upon receiving a URI "http://www.youtube.com/v/MyC0o1V1d3o," the device operating system may create the action of opening up a specific YouTube player on the device instead of opening a web browser, and upon receiving the URI, the device may "pull" the content with identification "MyC0o1V1d3o" from a YouTube server.

According to exemplary embodiments, custom visualizations may be built separately and installed as required, and presenting the custom visualization on the device's display may be triggered by sending the device a custom URI.

Certain exemplary embodiments of the invention may also be utilized to format, send and/or receive other various information to/from the device. For example, maintenance commands, scheduling for different content, notification of software updates from the server, requests for sensor data or logs, and pings to determine continued availability.

In accordance with certain exemplary embodiments, a custom operating system may be utilized for controlling access to protected content. For example, a client can access content restricted to its domain by running the custom system with a domain-authenticated account. In one exemplary embodiment, an Android operating system employing C2DM may be utilized on the devices to enable content security and control of the devices. In accordance with certain exemplary embodiments, C2DM messaging may provide push notifications to the device, eliminating the need for polling a server from the device, or for a persistent network connection. According to certain exemplary embodiments, C2DM capabilities may be built into the Android platform, which may enable any Android device (with an updated operating system) to be utilized for receiving the push messages and pulling the identified content for presentation.

In certain exemplary embodiments, a message from the central server to the device may need to contain information that exceeds a limitation for C2DM messaging. For example, currently, C2DM messages are limited to a 1024 bit length, and according to certain exemplary embodiments, such limitations may be handled for overly-long messages by sending a follow-on notification containing a URI pointing back to the server itself (similar to a URL shortening service). For example a message with the following long URL link: "http://www.myreally . . . <2048 bytes> . . . longurl.com" may be sent to the device as a short key "http://server/12345" or a pointer to a URL on the server which, when accessed by the device, returns the original long URL that can then be acted on as usual. In this way, network round trips only need to be utilized for those URLs that are too long to be messaged within the C2DM length limit. In accordance with exemplary embodiments, the invention may utilize C2DM messages that are shorter or longer than the current 1024-byte length limit, as such systems may change with new standards, technology, available bandwidth, etc. For example, C2DM messages having a limit length of 2048 bytes or greater may be available. Therefore, embodiments of the invention are not limited by the current C2DM length limit.

According to certain exemplary embodiments, certain URIs whose C2DM message would be over the limit for a single C2DM message may be handled by disassembling the long message and sending it as a series of short messages to the device, where it may be reassembled. For example, a central server may break the long URI into fragments which are each sent in a C2DM messages from which the remote device reassembles the fragments into the original URI, that can then be utilized to initiate an action. According to another exemplary embodiment, a central server may construct a unique, sufficiently short URI, which may sent in a single C2DM message that the remote device may then utilize to get the content. In an exemplary embodiment, a URL shortening service may be implemented either on the central server or via an external service.

In accordance with exemplary embodiments, the remote devices/displays may be controlled from the server side by an authorized entity or owner. The authorized entity, or owner may limit access to the devices/displays, for example, to avoid display of inappropriate content or other abuses.

In certain exemplary embodiments, a specific, targeted message may be sent to one individual remote device/display, which may in turn initiate the device/display to pull content from a specific source for presentation on the display. According to another exemplary embodiment, multiple devices/displays may be grouped for bulk control of content or updates. For example, an authorized entity may select all displays in reception areas worldwide for content updates. In another exemplary embodiment, content may be scheduled. According to certain exemplary embodiments, content may be scheduled for display with primary content scheduled for certain periods, secondary content scheduled for other periods, and so forth. For example, between the hours of 9 am and 5 pm, content from a first URL may be displayed. Otherwise, content from a second URL may be displayed. According to an exemplary embodiment, content may be stored on a system in communication with the C2DM server to enable resending favorites or history.

Exemplary embodiments may utilize push technology for digital signage. For example, a C2DM system may be utilized as a push mechanism to send user's content choices (URIs) to devices, which may include digital signage. According to an exemplary embodiment, the message system may also provide instructions that are not necessarily user-specified URIs, for example system commands, updates, etc., may be provided to one or more devices.

According to exemplary embodiments of the invention, various components, systems and methods for disseminating content to remote devices will now be described with reference to the accompanying figures.

FIG. 1 illustrates a content dissemination system 100 in accordance with certain exemplary embodiments. In one embodiment, one or more remote devices 110 may be in communication with a network 106. In an exemplary embodiment, the network 106 may include a local area network, a wide area network, the internet, etc. According to certain exemplary embodiments, the one or more remote devices 110 may communicate wired or wirelessly with the network 106. According to one embodiment, a remote device 110 may include a communications/processing unit 102 and a display unit 104. For example, the communications/processing unit 102 may include an Android-based device that has C2DM functionality. In other exemplary embodiments, communications/processing unit 102 and a display unit 104 may be integrated into a single remote device 110.

In accordance with exemplary embodiments, content may be disseminated to the devices 110 after they are registered. Registration, for example, with each individual device 110 may be utilized for discovery, control, authorization, security, and/or subsequent communications with the device 110. According to an exemplary embodiment, the devices 110 may include an application to initiate communications with the central server 116 upon connection to the network 106 or the internet. In one exemplary embodiment, an operating system associated with the device 110 may check for updates to the firmware or operating system when the device 110 is connected to the internet. In one embodiment, the update process may initiate registration of the device 110 with the central server 116. In another embodiment, registration of the device 110 with the central server 116 may be initiated when the device 110 detects a network or internet connection. According to one exemplary embodiment, during registration, the central server 116 may communicate with each detected individual device 110 to exchange registration information, security keys, device-specific information, etc. According to an exemplary embodiment, the central server 116 may store the registration information 112 for each detected device 116, and any initial and/or subsequent communications with the device 110 involving C2DM messages for content dissemination may involve checking or verifying the registration information 112. In accordance with certain exemplary embodiments, an authorized user 114 may be established during the registration process, and subsequently validated via password, authorization code, etc.

In an exemplary embodiment, once the registration process has completed and an authorized user 114 has been established, the authorized user 114 may initiate content dissemination to any of the authorized and registered individual devices 110. According to exemplary embodiments, the authorized user 114 may communicate with the central server 116 via workstation, personal computer, server, mobile computing device, smart phone, etc.

In accordance with certain exemplary embodiments of the invention, and as previously discussed, a specific, targeted message may be sent to an individual remote device 102 or multiple devices 110, which may in turn, initiate the device(s) 110 to pull content from a specific content source 118 for presentation on the device(s) 110 and/or separate devices 102 and associated displays 104. For example, the content source 118 may include web pages, images, rich web applications, video, audio, text, etc. According to exemplary embodiments, the initiation of content dissemination to a device 110 by an authorized user 114, for example, may involve communications with the central server 116, which may produce or format a C2DM message based on the content source 118 and registration information 112. According to an exemplary embodiment, and as previously discussed, the generated C2DM message may then be sent to the individual device(s) 110 and the C2DM message may initiate the device(s) 110 to pull the selected content from the specified content source 118.

Figure 2:
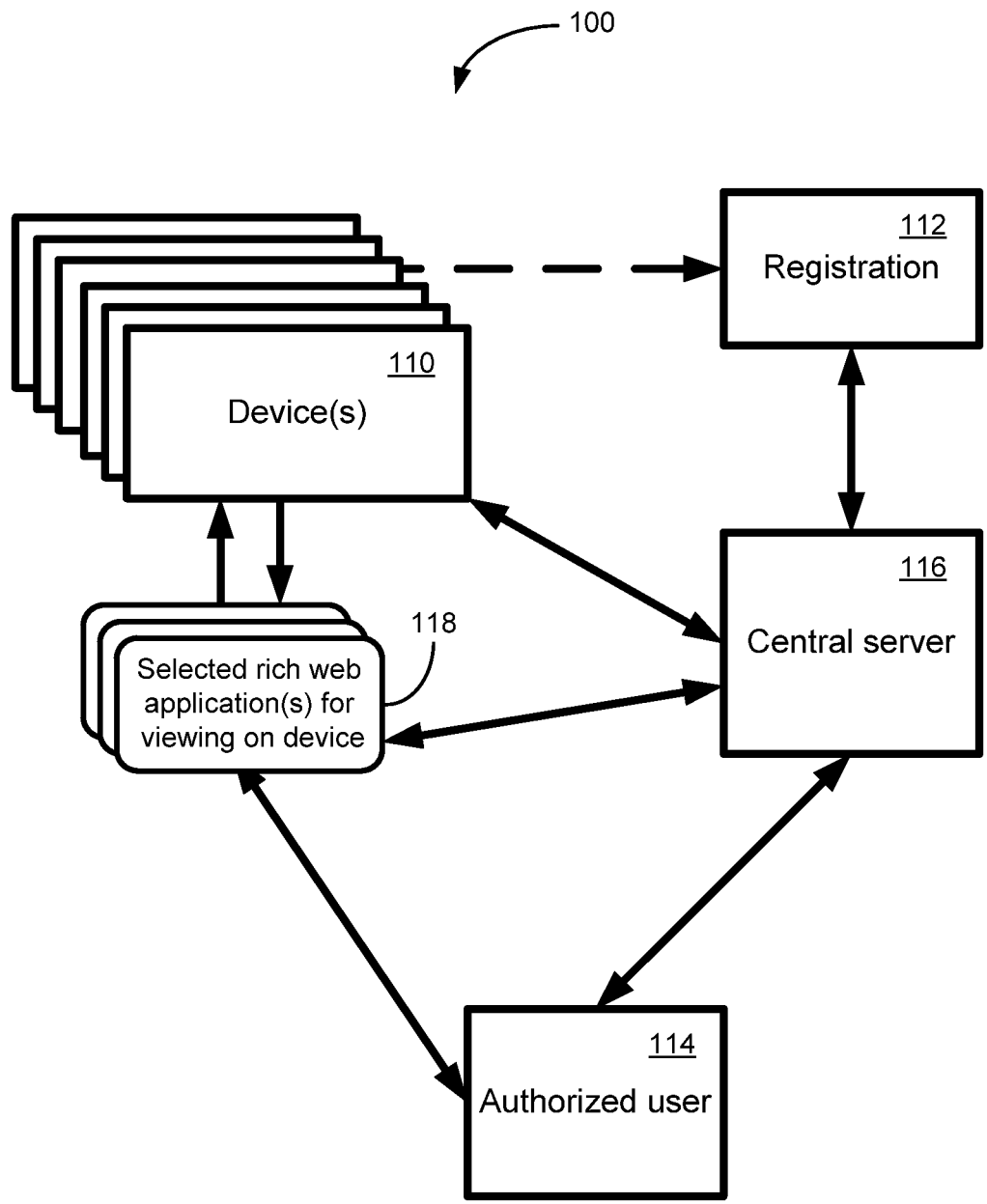
FIG. 2 is another illustrative block diagram view of the content dissemination system 100 depicting various interactions, according to an exemplary embodiment of the invention.

FIG. 2 depicts another illustrative block diagram view of the content dissemination system 100, showing the various interactions that may transpire according to an exemplary embodiment of the invention. For example, the device(s) 110, upon detection of an internet connection, may communicate with a central server 116, to establish registration 112 of the device with the central server 116. Optionally, the device(s) 110 may communicate directly with a registration server 112, which may be in communication with the central server 116. Once registration is established with the device(s) 110, an authorized user 114 may select one or more registered devices 110 and the desired content from one or more content sources 118. In an exemplary embodiment, the central server 116 may format and send a C2DM message to the selected device(s) 110 with an address of the selected content; and, the device(s) 110 may then pull the selected content from the content source 118. Accordingly, embodiments of the invention may eliminate unnecessary traffic through the central server 116.

Figure 3:
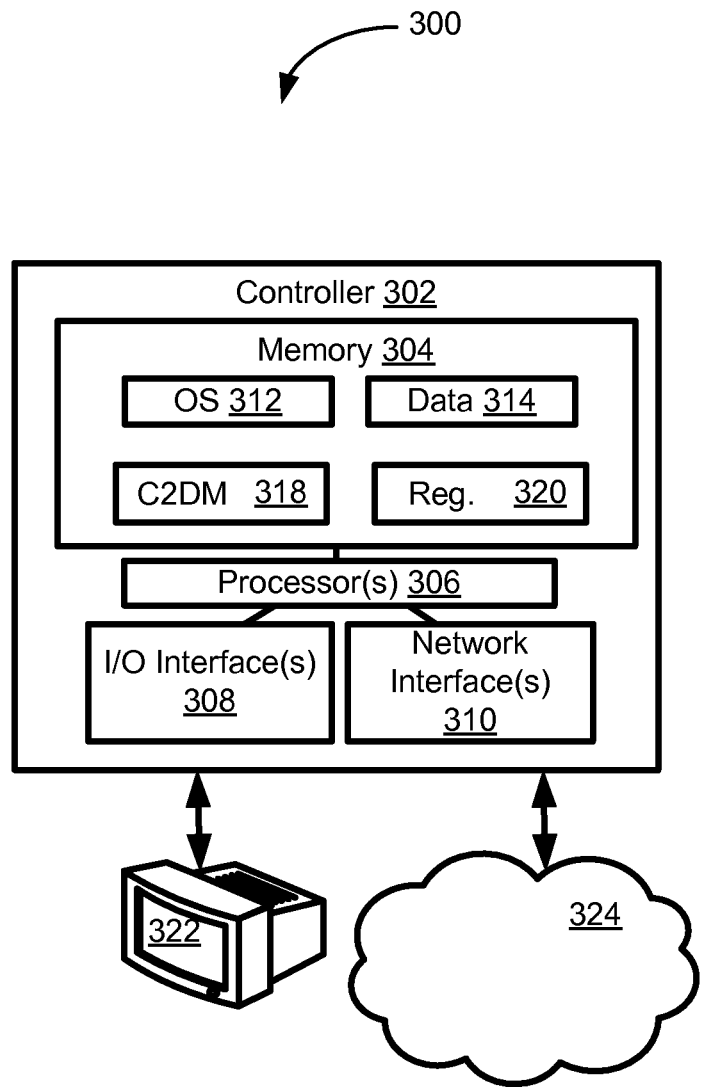
FIG. 3 is a block diagram of an illustrative central server control system 300, according to an exemplary embodiment of the invention.

FIG. 3 depicts a block diagram of an illustrative central server control system 300 in accordance with an exemplary embodiment of the invention. The control system 300 may include a controller 302 having a memory 304, one or more processors 306, and an input/output interface 308 and/or a network interface 310. In exemplary embodiments, the controller 302 may communicate with a network 324 via the network interface 310. In exemplary embodiments, the controller 302 may communicate with a local workstation, computer, or other computing device 322 via the input/output interface 322. In exemplary embodiments, the controller 302 may communicate with a remote workstation, computer, or other computing device 322 via the network interface 310.

According to an exemplary embodiment, the memory 302 associated with the controller may include an operating system 312, data 314 and various firmware/software modules or application for performing specific function associated with the dissemination of content. In an exemplary embodiment, the memory 304 may include a C2DM module 318 for preparing and formatting C2DM messages. In an exemplary embodiment, the memory 304 may include a registration module 320 for registering devices (such as devices 110 in FIG. 1 or FIG. 2).

Figure 4:
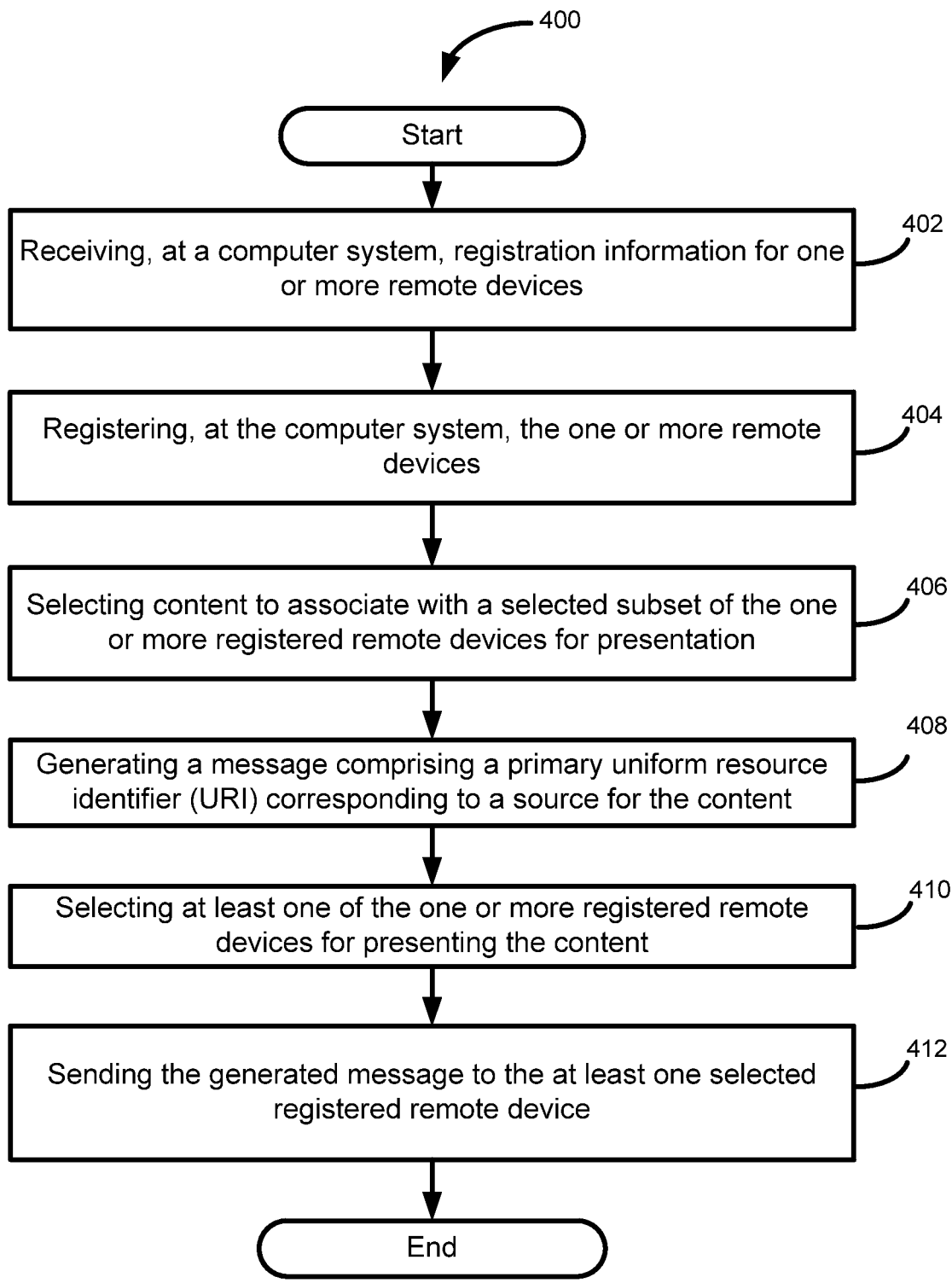
FIG. 4 is a flow diagram of an exemplary method according to an exemplary embodiment of the invention.

An exemplary method 400 for disseminating content to a device will now be described with reference to the flowchart of FIG. 4. The method 400 starts in block 402, and according to an exemplary embodiment of the invention includes receiving, at a computer system, registration information for one or more remote devices. In an exemplary embodiment, the one or more remote devices are configured at least to present one or more of visual or audible information. In block 404, the method 400 includes registering, at the computer system, the one or more remote devices. In an exemplary embodiment, the registering is based at least in part on the received registration information. In block 406, the method 400 includes selecting content to associate with a selected subset of the one or more registered remote devices for presentation by the selected subset of the one or more registered remote devices. In block 408, the method 400 includes generating a message comprising a primary uniform resource identifier (URI) corresponding to a source for the content. In block 410, the method 400 includes selecting at least one of the one or more registered remote devices for presenting the content. In block 410, the method 400 includes sending the generated message to the at least one selected registered remote device. According to an exemplary embodiment, the at least one selected registered remote device is configured to automatically retrieve the content from the source identified by the primary URI in the message. According to an exemplary embodiment, the at least one selected registered remote device is further configured to automatically present the retrieved content. The method 400 ends after block 412.

Exemplary embodiments of the invention further include systems, methods and computer readable media for associating the content with one or more corresponding default applications for opening and presenting the content at the remote device or a selected subset of the one or more registered remote devices. According to an exemplary embodiment, the generated message is less than or equal to 1024 bytes in length. Exemplary embodiments further include generating a secondary reference URI associated with the primary URI when length restrictions are exceeded in the generated message. In an exemplary embodiment, the message comprising the primary URI further corresponds to the secondary reference URI, wherein the secondary reference URI corresponds to the source for the content. In an exemplary embodiment, sending the generated message to the at least one selected registered remote device includes sending information for generating one or more of images, rich web content, custom visualizations, sound, an update, a setup, a configuration, or scheduling information.

Figure 5:
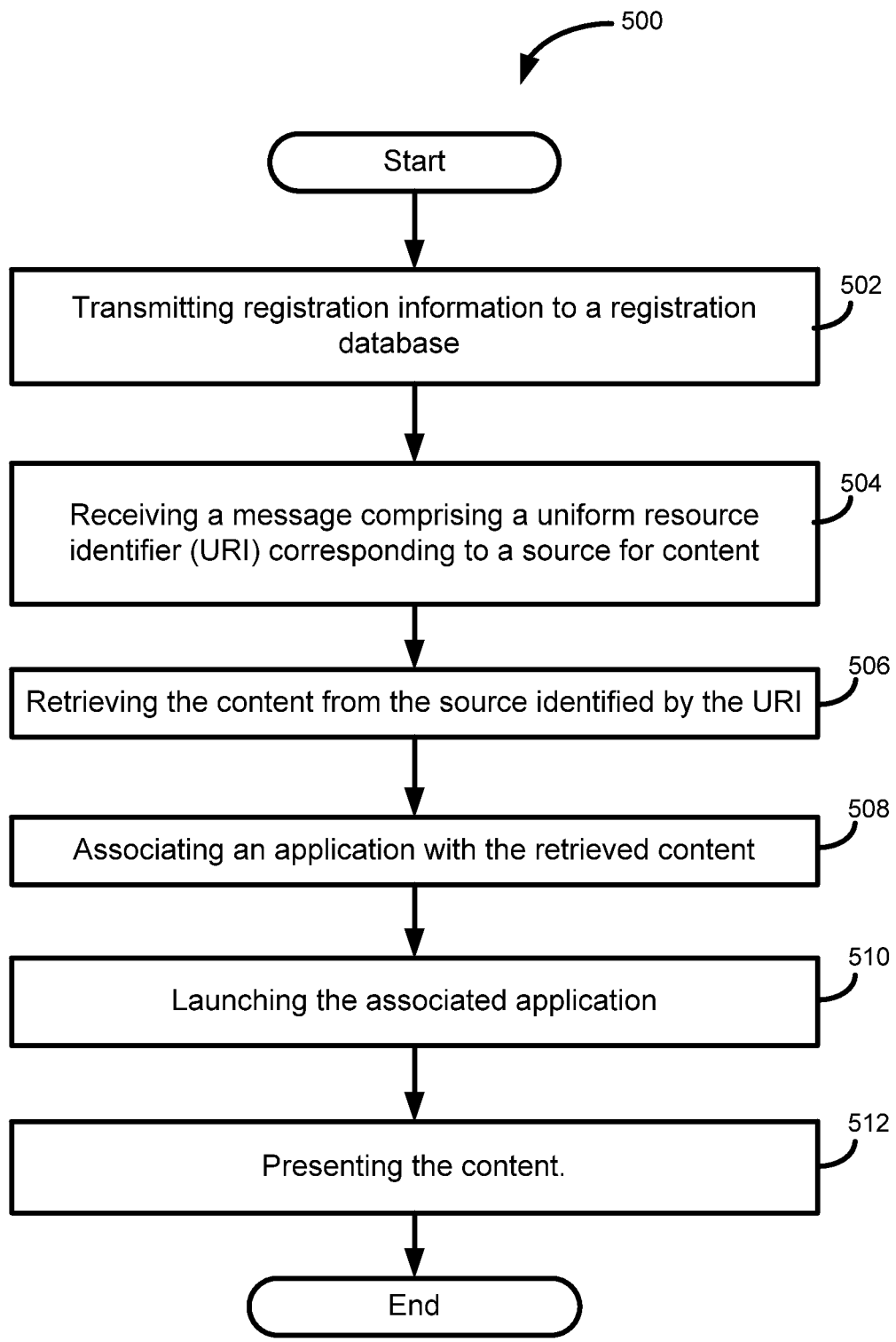
FIG. 5 is a flow diagram of an exemplary method according to an exemplary embodiment of the invention.

An exemplary method 500 for registering a device and presenting selected content on the device will now be described with reference to the flowchart of FIG. 5. The method 500 starts in block 502, and according to an exemplary embodiment of the invention includes transmitting registration information to a registration database. In block 504, the method 500 includes receiving, based at least in part on the registration information, a message comprising a uniform resource identifier (URI) corresponding to a source for content. In block 506, the method 500 includes retrieving the content from the source identified by the URI. In block 508, the method 500 includes associating an application with the retrieved content. In block 510, the method 500 includes launching the associated application. In block 512, the method 500 includes presenting the content. In an exemplary embodiment, presenting the content includes generating one or more of images, rich web content, custom visualization, animation, sound, an update, a setup, scheduled content, or a configuration. The method 500 ends after block 512.

Exemplary embodiments of the invention further include systems, methods and computer readable media for associating a default application with one or more of information in the URI or information in the retrieved content. According to exemplary embodiments, presenting the content comprises generating one or more of images, rich web content, custom visualization, animation, sound, an update, a setup, a configuration, or scheduling. Exemplary embodiments include associating the content with corresponding default applications for opening and presenting the content. According to an exemplary embodiment, receiving the message includes receiving a message that is less than or equal to a cloud-to-device-messaging (C2DM) length limit. In one exemplary embodiment, receiving the message includes receiving a message that is less than or equal 1024 bytes. In one exemplary embodiment, receiving the message includes receiving a message that is less than or equal 2048 bytes. In one exemplary embodiment, receiving the message includes receiving a message that is less than or equal 4096 bytes. Exemplary embodiments further include receiving a secondary reference URI associated with the primary URI when length restrictions are exceeded in the message, wherein the secondary reference URI corresponds to the source for the content.

According to exemplary embodiments, certain technical effects can be provided, such as creating certain systems and methods that provide efficient content dissemination to remote devices for presentation. Exemplary embodiments of the invention can provide the further technical effects of providing systems and methods for controlling and/or scheduling content for presentation on a plurality of remote devices.

In exemplary embodiments of the invention, the dissemination system 100 and/or the control system 300 may include any number of hardware and/or software applications that are executed to facilitate any of the operations. In exemplary embodiments, one or more I/O interfaces may facilitate communication between the dissemination system 100 and/or the control system 300 and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the dissemination system 100 and/or the control system 300. The one or more I/O interfaces may be utilized to receive or collect data and/or user instructions from a wide variety of input devices. Received data may be processed by one or more computer processors as desired in various embodiments of the invention and/or stored in one or more memory devices.

One or more network interfaces may facilitate connection of the dissemination system 100 and/or the control system 300 inputs and outputs to one or more suitable networks and/or connections; for example, the connections that facilitate communication with any number of peripherals associated with the system. The one or more network interfaces may further facilitate connection to one or more suitable networks; for example, a local area network, a wide area network, the Internet, a cellular network, a radio frequency network, a Bluetooth™ enabled network, a Wi-Fi™ enabled network, a satellite-based network any wired network, any wireless network, etc., for communication with external devices and/or systems.

As desired, embodiments of the invention may include the dissemination system 100 and/or the control system 300 with more or less of the components illustrated in FIGS. 1-3.

Certain embodiments of the invention are described above with reference to block and flow diagrams of systems and methods and/or computer program products according to exemplary embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an exemplary, embodiments of the invention may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While certain embodiments of the invention have been described in connection with what is presently considered to be the most practical and various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the invention, including the best mode, and also to enable any person skilled in the art to practice certain embodiments of the invention, including making and using any devices or systems and performing any incorporated methods. The patentable scope of certain embodiments of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claimed invention is:

1. A computer-implemented method comprising:
    transmitting registration information to a registration database, wherein the registration information comprises information identifying one or more respective computing devices;
    receiving, based at least in part on the registration information, a message comprising a uniform resource identifier (URI) corresponding to a source for content;
    retrieving the content from the source identified by the URI, wherein retrieving the content from the source identified by the URI comprises retrieving the content from a secondary URI when message length restrictions are exceeded, wherein the secondary URI is associated with the URI, and wherein the secondary reference URI corresponds to the source for the content;

associating an application on at least one of the one or more computing devices with the retrieved content;

launching the associated application on the at least one of the one or more computing devices; and presenting the retrieved content on a display via the associated application.

2. The method of claim 1, wherein presenting the retrieved content comprises generating one or more of images, rich web content, custom visualization, animation, sound, an update, a setup, scheduled content, and a configuration.

3. The computer-implemented method of claim 1, wherein associating the application with the retrieved content comprises associating a default application with one or more of information in the URI or information associated with the retrieved content.

4. The computer-implemented method of claim 1, further comprising associating the content with one or more corresponding default applications for opening and presenting the content.

5. The computer-implemented method of claim 1, further comprising transmitting status information to a remote server, wherein the status information includes data signifying one or more of a ready state, an online state, a busy state, a power status, an error, and a completed task.

6. A system comprising:

a display screen;

one or more processors in communication with the display screen; and at least one memory in communication with the one or more processors and configured for storing data and instructions that, when executed by the at least one processor, cause the system to:

transmit registration information to a registration database, wherein the registration information comprises information identifying one or more respective computing devices;

receive, based at least in part on the registration information, a message comprising a uniform resource identifier (URI) corresponding to a source for content;

retrieve the content from the source identified by the URI, wherein retrieving the content from the source identified by the URI comprises retrieving the content from a secondary URI when message length restrictions are exceeded, wherein the secondary URI is associated with the URI, and wherein the secondary reference URI corresponds to the source for the content;

associate an application with the retrieved content on at least one of the one or more computing devices;

launch the associated application on at least one of the one or more computing devices; and presenting the retrieved content on the display screen via the associated application.

7. The system of claim 6, wherein the retrieved content comprises one or more of images, rich web content, custom visualization, animation, sound, an update, a setup, scheduled content, and a configuration.

8. The system of claim 6, wherein a default application is associated with information in the URI or information in the retrieved content.

9. The system of claim 6, wherein the content is associated with one or more corresponding default applications for opening and presenting the content.

10. The system of claim 6, wherein the instructions, when executed by the at least one processor, further cause the system to transmit status information to a remote server, wherein the status information includes data signifying one or more of a ready state, an online state, a busy state, a power status, an error, and a completed task.

11. A non-transitory computer-readable medium that stores instructions that, when executed by at least one processor in a system, cause the system to perform a method comprising:

transmitting registration information to a registration database, wherein the registration information comprises information identifying one or more respective computing devices;

receiving, based at least in part on the registration information, a message comprising a uniform resource identifier (URI) corresponding to a source for content;

retrieving the content from the source identified by the URI, wherein retrieving the content from the source identified by the URI comprises retrieving the content from a secondary URI when message length restrictions are exceeded, wherein the secondary URI is associated with the URI, and wherein the secondary reference URI corresponds to the source for the content;

associating an application with the retrieved content on at least one of the one or more computing devices;

launching the associated application on at least one of the one or more computing devices; and presenting the retrieved content on a display via the associated application.

12. The computer-readable medium of claim 11, wherein presenting the retrieved content comprises generating one or more of images, rich web content, custom visualization, animation, sound, an update, a setup, scheduled content, and a configuration.

13. The computer-readable medium of claim 11, wherein associating the application with the retrieved content comprises associating a default application with one or more of information in the primary URI or information in the retrieved content.

14. The computer-readable medium of claim 11, further comprising associating the content with one or more corresponding default applications for opening and presenting the content.

* * * * *